US008867726B2

(12) United States Patent
Cazanas et al.

(10) Patent No.: US 8,867,726 B2
(45) Date of Patent: Oct. 21, 2014

(54) METHODS AND SYSTEMS FOR AUTHORIZING CALL FORWARDING

(75) Inventors: Carlos A. Cazanas, Bethlehem, PA (US); Azam Khan, Franklin, NJ (US); Robin P. Clair, Flower Mound, TX (US); Gregory S. May, Fort Worth, TX (US)

(73) Assignee: Cellco Partnership, Basking Ridge, NJ (US)

( * ) Notice: Subject to any disclaimer, the term of this patent is extended or adjusted under 35 U.S.C. 154(b) by 39 days.

(21) Appl. No.: 13/490,114

(22) Filed: Jun. 6, 2012

(65) Prior Publication Data

US 2013/0329878 A1    Dec. 12, 2013

(51) Int. Cl.
*H04M 3/42*    (2006.01)

(52) U.S. Cl.
USPC ..................................................... 379/211.02

(58) Field of Classification Search
USPC .......................... 379/207.02, 211.01, 211.02
See application file for complete search history.

(56) References Cited

U.S. PATENT DOCUMENTS

| 5,553,128 | A * | 9/1996 | Grimes | 379/211.02 |
| 6,925,162 | B1 * | 8/2005 | Porter et al. | 379/211.02 |
| 2008/0002820 | A1 * | 1/2008 | Shtiegman et al. | 379/211.02 |
| 2012/0281823 | A1 * | 11/2012 | Colbert | 379/202.01 |

* cited by examiner

*Primary Examiner* — Nafiz E Hoque

(57) ABSTRACT

A call forwarding server in a telephony network is configured to provide an authorization function during activation of a call forwarding service. In response to receiving a forwarding request including initiating and terminating telephone numbers (TN), the call forwarding server generates and sends a request for the terminating TN to obtain authorization for the forwarding service. In response to receiving an authorization response for enabling call forwarding, the call forwarding server enables call forwarding for the initiating TN by updating a call forwarding record to include an entry including the initiating TN and the terminating TN. Communications placed to the initiating TN are automatically forwarded to the terminating TN once the forwarding service is enabled.

20 Claims, 4 Drawing Sheets

METHODS AND SYSTEMS FOR AUTHORIZING CALL FORWARDING

BACKGROUND

A call forwarding service allows a user to forward calls placed to a first telephone number such that the calls are forwarded to a second telephone number. To activate the call forwarding service, a user of the line or device corresponding to the first telephone number typically dials a code, such as "*72," followed by the second telephone number. A switch or the like in the telephone network detects the activation code dialed by the user and turns on the call forwarding function in the network. Once the call forwarding service is activated, the network routes all calls placed to the first telephone number to the line or device identified by the second telephone number. To de-activate the call forwarding service, the user of the first telephone number dials a code, such as "*73". Other techniques may be used to turn ON and turn OFF call forwarding, for example, when the user is operating a device not directly associated with the initiating number for which calls are to be forwarded. For a smartphone, an application may configure the phone to do the dialing automatically, in response to simpler selection inputs by the user.

The call forwarding service does not require any authorization during activation, and in particular does not require any authorization from the part of a user of the device that receives calls directed to the second telephone number. A user of the device associated with the second telephone number may thus receive calls forwarded to the second telephone number without wanting to receive such calls. A need therefore exists for a call forwarding system that requires authorization by a party who will receive forwarded calls in order to enable or activate a call forwarding service.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. In other instances, well known methods, procedures, components, and/or circuitry have been described at a relatively high-level, without detail, in order to avoid unnecessarily obscuring aspects of the present teachings.

The various methods and systems disclosed herein relate to providing an authorization function during activation of a call forwarding service.

A call forwarding service enables a user of a first user equipment device (UE) having a first telephone number (TN) to forward calls placed to the first TN to a second UE having a second TN. When the call forwarding service is activated, calls placed and messages sent to the first TN are automatically routed to the second TN so that they may be received on the second UE. In general, the setup of the call forwarding service is performed from the first UE, and requires neither authorization nor confirmation from the second UE for activation.

An improved call forwarding service is discussed by way of example below. In that service example, a call forwarding request is received at a call forwarding server (CFS). The call forwarding request includes a code for requesting call forwarding services (e.g., a code such as "*72" for identifying the request as a call forwarding request), and identification for an originating TN (also referred to as an initiating TN) and a terminating TN (also referred to as a destination TN). In general in an IP multimedia subsystem (IMS) system, the call forwarding request may be received at the CFS from a Call Session Control Function (CSCF) server which received the request from the first UE and forwarded the request to the CFS. Upon receiving the call forwarding request, the CFS sends an authorization request message for the terminating TN identified in the forwarding request. If an authorization response message is received for the terminating TN at the CFS, the CFS authorizes the call forwarding and updates a call forwarding record to include an entry including the initiating TN and the terminating TN. In the example, the CFS additionally sends a forwarding response message for the sender of the initial forwarding request message. In an IMS system, the forwarding response message may be sent from the CFS to the CSCF, and forwarded from the CSCF to the first UE associated with the initiating TN. The CFS can also send a forwarding enable message to the Media Resource Function (MRF) server, such that the MRF sends a confirmation tone or message to the UE associated with the initiating TN.

Figure 1:
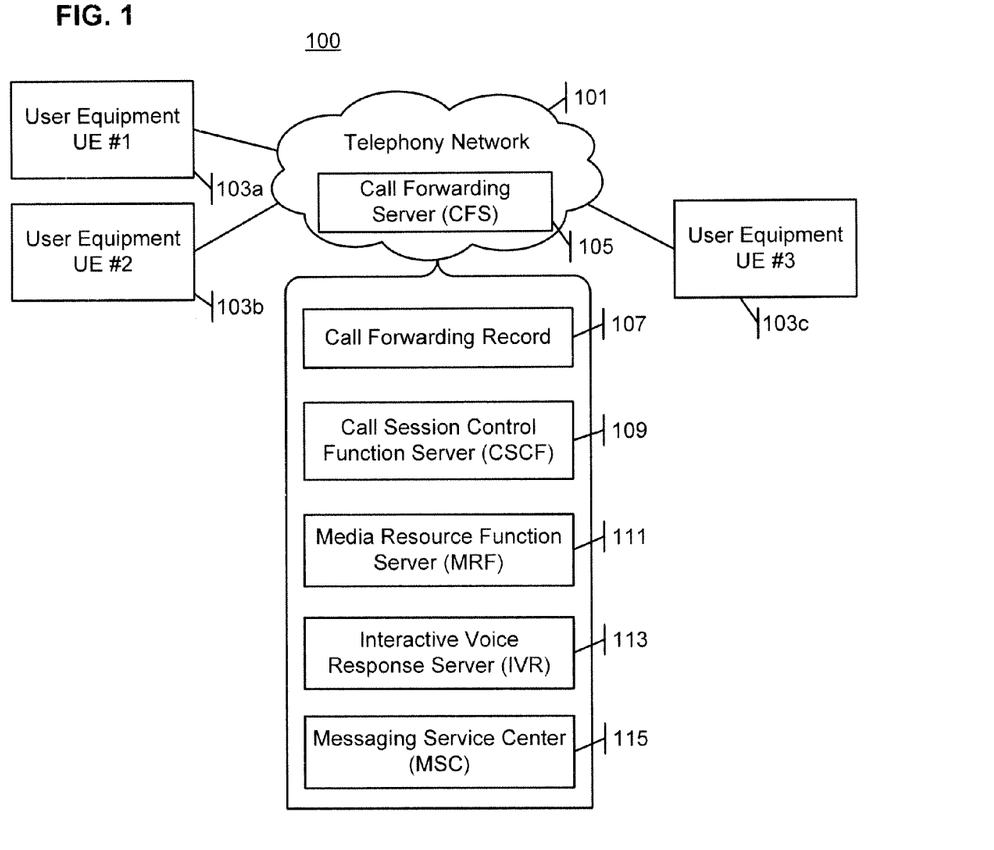
FIG. 1 is a high-level functional block diagram of a system for providing an authorization service for call forwarding.

Reference now is made in detail to the examples illustrated in the accompanying drawings and discussed below. FIG. 1 illustratively shows a high-level functional block diagram of a system 100 for providing an authorization service for call forwarding.

The system 100 for providing the authorization service for call forwarding includes a telephony network 101 for providing telephone services between two or more user equipment (UE) terminals 103a, 103b, 103c (referenced generally as UE temiinals 103). A user equipment terminal 103 may correspond to a mobile telephone terminal (e.g., a mobile station MS), a wireline telephone terminal, or the like. Each user equipment terminal 103 has a telephone number (TN) associated therewith. The telephony network 101 may provide voice communication services between two or more user equipment terminals 103, as well as messaging, data, and other communication services. The telephony network 101 may also provide communication services between user equipment terminals 103 and other types of devices (not shown in FIG. 1), such as providing IP-based data communication services between user equipment terminals and computers connected to the telephony network through the Internet. Each UE 103 can include one or more of a processor, a display, a user input device, a transceiver (or receiver and transmitter circuitry), and a non-volatile memory for storing programming instructions for execution on the processor.

The system 100 includes a call forwarding server (CFS) 105 for providing call forwarding services between user equipment terminals 103. The call forwarding CFS 105 can provide call forwarding service for a particular TN associated with a UE terminal 103. In an example, the call forwarding CFS 105 may be configured to forward communications addressed to a particular TN (i.e., an originating TN) to a UE associated with a different TN (i.e., a terminating TN). When call forwarding is enabled, the call forwarding CFS 105 directs communications addressed to the originating TN to the UE associated with the terminating TN. As a result, telephone calls, messaging service messages, and/or other types of communications are forwarded and received on the UE associated with the terminating TN. In addition, the CFS 105 is configured to setup and activate a call forwarding service, and obtain authorization for the call forwarding service, in response to receiving a call forwarding request message. In some examples, the CFS 105 is a telephony application server (e.g., a dedicated call forwarding application server, a distributed application server, or an application server used for call forwarding and for other application services), while in other examples, the CFS 105 forms part of a telephone exchange and the functions described as being performed by the CFS 105 are performed in various components and switches of the telephone exchange.

In addition, the telephony network 101 can include other components used in providing the call forwarding service. In particular, in the example shown in FIG. 1, the telephony network 101 is an IP multimedia subsystem (IMS) network that includes one or more of a call forwarding record 107, a call session control function (CSCF) server 109, a media resource function (MRF) server 111, an interactive voice response (IVR) server 113, and one or more messaging service center (MSC) server(s) 115. For convenience, other known elements in the telephony network 101 (such as additional servers, routers, and base stations) that are not relevant to this discussion have been omitted for convenience.

The call forwarding record 107 includes one or more entries corresponding to authorized and activated call forwarding requests. Each entry in the record 107 includes a pair of an originating TN and a terminating TN, such that communications addressed to the originating TN of a record entry are forwarded to a UE associated with the corresponding terminating TN of the record entry. In general, the call forwarding record 107 is connected to (or otherwise communicatively accessible by) the call forwarding CFS 105 such that the CFS 105 can update the record 107 to include a new call forwarding entry when a call forwarding service is requested and authorized, or to remove a call forwarding entry when a call forwarding service is deactivated or otherwise discontinued. The call forwarding CFS 105 may also consult the record 107 to determine whether a call forwarding entry associated with a particular TN exists, to determine the terminating TN associated with the entry if an entry exists, and to forward communications addressed to the particular TN to the UE associated with the terminating TN as needed. The call forwarding record 107 may additionally or alternatively be accessed by other systems of the telephony network 101, such as switches used for routing calls between TNs and UE terminals connected to and communicating through the telephony network 101.

The call forwarding record 107 may indicate which types of communications should be forwarded to the terminating TN. Forwarded communications may include telephone calls, telephone conference calls, messaging service messages (e.g., short messaging service (SMS) messages, multimedia messaging service (MMS) messages, enhanced messaging service (EMS) messages, or the like). In general, all communications addressed to the originating TN may be forwarded to the terminating TN. In some embodiments, however, only telephone calls and telephone conference calls may be forwarded to the terminating TN. In other embodiments, the call forwarding record 107 may specify the particular types of communications that should be forwarded to the terminating TN (e.g., calls, messages (or particular types of messages: SMS, MMS, EMS), or both), such that only the specified communications are forwarded. In other embodiments, the call forwarding record 107 may specify different terminating TNs for different types of communications, for example such that calls are forwarded to a first terminating TN while messages are forwarded to a different second terminating TN.

The particular types of communications that should be forwarded may be determined based on user preference information associated with a TN or with a user account. The user preference information may be stored in a user preference database, and retrieved by the CFS 105 during the setup of a call forwarding service to as to configure the call forwarding service according to the stored information. The preference information may be based on past settings used with the TN or user account when setting up call forwarding services. The preference information may be based on pre-configured preference information provided by a user via a call forwarding application (e.g., a call forwarding application running on UE terminal 103, or through a web portal).

Alternatively, the particular types of communications that should be forwarded may be identified in a forwarding request transmitted to the CFS 105. Thus, a forwarding request received by the CFS 105 may indicate whether all, or only certain types of, communications should be forwarded. In one example, the types of communications to be forwarded are identified in a code (e.g., a dial-tone code) included in the forwarding request, for example by dialing "*72#1" for all communications to be forwarded, dialing "*72#2" for only voice communications (e.g., telephone calls) to be forwarded, or dialing "*72#3" for only messaging communications to be forwarded. Thus, the forwarding request may include a generalized forwarding instruction portion (e.g., "*72") indicating that forwarding is to occur and a specialized forwarding instruction portion (e.g., "#1") indicating the type of forwarding selected. In other embodiments, the forwarding requests may be wholly individualized (e.g., besides the "*" entirely different dial codes). In another example, the types of communications to be forwarded may be identified by a user using a call forwarding application.

In some examples, the call forwarding record 107 is a database stored in a server that is communicatively coupled to the telephony network 101, to the CFS 105, to the MSC 115, and to switches used for routing calls through the telephone network 101. The call forwarding record 107 may be a database stored in a dedicated, standalone server, or a database stored in the CFS 105, for example. In other examples, the call forwarding record 107 is distributed across multiple servers, such that the call forwarding record is a collection of call forwarding records that are not necessarily stored in a single database, server, or location. In one such example, call forwarding entries are stored in one or more home location registers (HLR), switches, or control nodes of the telephony network 101, such that each call forwarding entry corresponding to an authorized and activated call forwarding request is stored as part of a call processing control record associated with the originating TN in a home switch or control node of network 101. In the example, if a communication addressed to the originating TN is received in the telephony network 101, the home switch or control node determines that the communication should be forwarded to the terminating TN based on the information stored in the call processing control entry associated with the originating TN, and the communication is thus redirected to the terminating TN.

The call session control function (CSCF) server 109 processes signaling messages in the telephony network 101, including session initiation protocol (SIP) signaling messages. In particular, the CSCF 109 may process signaling messages in an IMS network associated with the telephony network 101. In one example, the CSCF 109 may process and relay messages related to a call forwarding service, such as messages exchanged between a UE 103 and the call forwarding CFS 105. In the example, the CSCF 109 receives a call forwarding request message for the call forwarding service from an initiating UE 103a, and forwards the request message to the CFS 105. The CSCF 109 receives the call forwarding response message from the CFS 105, and forwards the request message to an initiating UE 103a. The CSCF can also perform processing of the messages, so as to determine an appropriate forwarding destination and format for each processed message.

The media resource function (MRF) server 111 provides media-related services on the telephony network 101. In one example, the MRF 111 can generate tones and/or other audio or media related outputs for use on telephony network 101. In the example, once a call forwarding service has been enabled for an initiating TN, the MRF 111 may in response to receiving a forwarding enable message generate and transmit to a UE associated with the initiating TN a confirmation tone indicating that the call forwarding service has successfully been authorized and enabled or activated. The MRF 111 may, in response to receiving the forwarding enable message, send a forwarding enable acknowledgement message to the call forwarding CFS 105.

The interactive voice response (IVR) server 113 provides interactive voice response services for use with UE terminals 103 on the telephony network 101. The IVR 113 can, in response to receiving an IVR request, make a telephone call to a UE 103 associated with the TN included in the IVR request, offer a series of interactive voice prompts, receive one or more responses from a user (e.g., in the form of keypad presses on or tones from the UE 103, in the form of voice responses processed by a voice recognition unit, or the like), and based on the received responses, adjust the offered series of interactive voice prompts and/or report the received responses to a server or other element of the call forwarding system 100.

The messaging service center (MSC) server(s) 115 provides messaging services for use with UE terminals 103 on the telephony network 101. The MSC server(s) 115 may include one or more of each of a short message service center (SMSC) server, a multimedia message service center (MMSC) server, an enhanced message service center (EMSC) server, or the like. The messaging service servers may receive messaging service messages (e.g., short messaging service (SMS) messages, multimedia messaging service (MMS) messages, enhanced messaging service (EMS) messages, or the like) from UE terminals 103 of the telephony network 101 for transmission to other UE terminals 103 of the same or other telephony networks. The messaging service servers may also receive messaging service messages from other telephony networks for transmission to UE terminals 103 of network 101, and transmit the receive messages to the EU terminals 103.

In embodiments in which messaging service messages addressed to one or more TNs are to be forwarded, the MSC 115 may cause the messages to be forwarded to respective terminating TNs based on the call forwarding record 107. In particular, when the MSC 115 receives a messaging service message addressed to a destination TN, the MSC 115 may check the call forwarding record 107 for any entries having the destination TN as an originating TN. If a matching entry is located, the MSC 115 determines whether the entry applies to the type of the message and, if the entry applies to the type of message, the MSC 115 forwards the message to the terminating TN identified in the matching entry. If the matching entry does not apply to the type of message, the MSC 115 sends the message to the original destination TN identified in the message. In general, the call forwarding record 107 may be a database communicatively coupled to the MSC 115. In some embodiments, however, the call forwarding record 107 may include a local database stored in the MSC 115. In such embodiments, the local database may store the call forwarding record 107, a copy of the call forwarding record 107, or those entries of the call forwarding record 107 that pertain to the forwarding of messaging service messages. In such embodiments, each time the call forwarding server 105 receives an authorization response message authorizing a call forwarding service (or a call forwarding service including forwarding of messaging service messages), the call forwarding server 105 may transmit to the MSC 115 instructions to update the local database to include a corresponding call forwarding entry.

Figure 2:
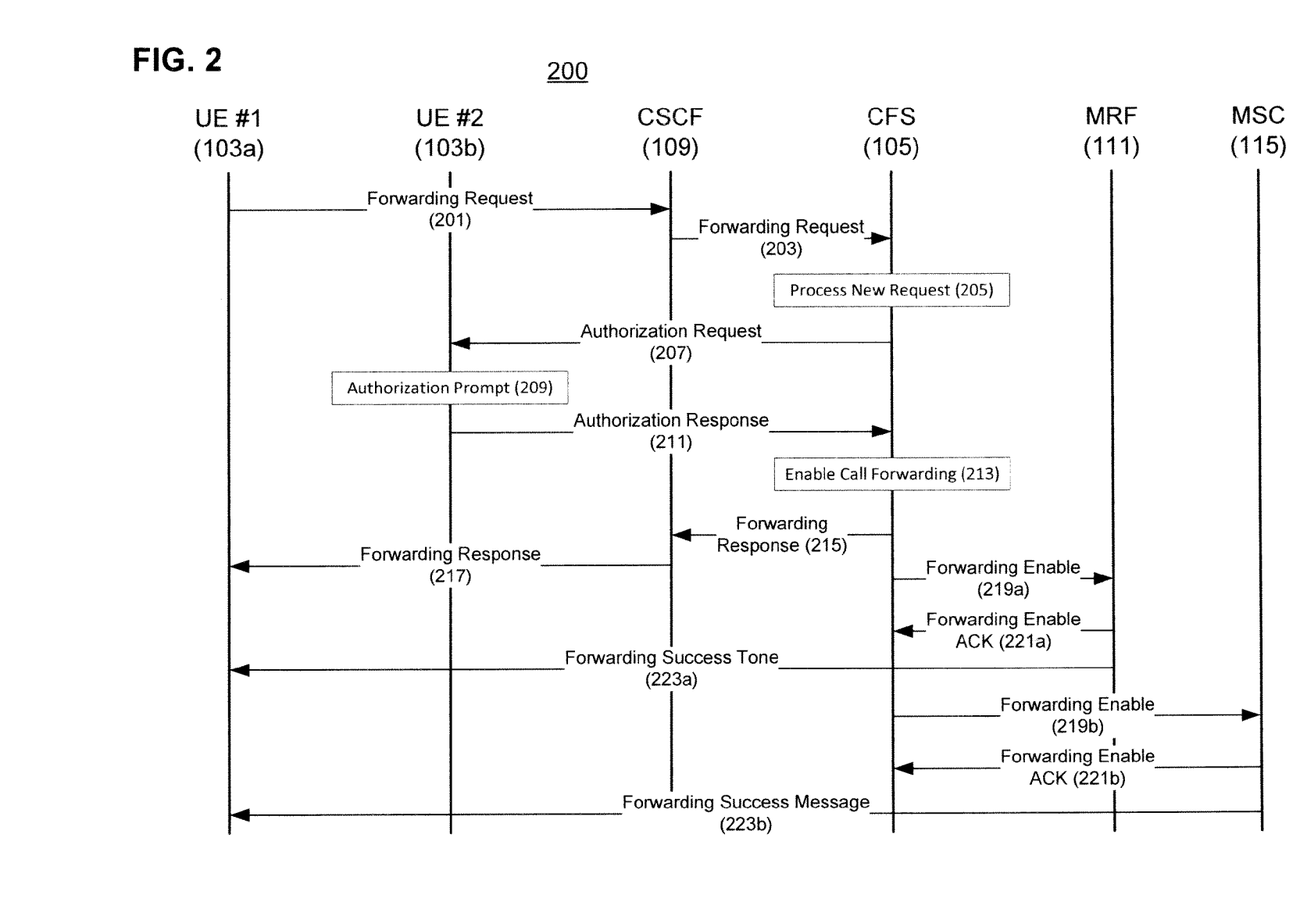
FIG. 2 is a flow diagram illustratively showing communication flow during an operation to setup and authorize a call forwarding service.

FIG. 2 illustratively shows a communication flow of a method 200 used for setting up and authorizing a call forwarding service. According to the method 200, a call forwarding service is requested and authorized to enable call forwarding from an originating TN (e.g., a TN associated with a first UE 103a) to a terminating TN (e.g., a TN associated with a second UE 103b).

The method 200 begins with the generation of a request for a call forwarding service, the request including an initiating TN and a terminating TN. In step 201, the forwarding request is received by the CSCF 109. In general, the forwarding request may be generated in a first UE 103a associated with the initiating TN, and transmitted through the telephony network 101 from the first UE 103a to the call forwarding CFS 105 via the CSCF 109. The forwarding request may be a dial-tone command message (e.g., a sequence of dial tones including a code for call forwarding services, such as a "*72" dial code), a text message, or the like that is received through the telephony network 101. In some examples, the forwarding request may be generated in an application program running on the UE 103a or in another computer system, and may take the form of a text message, an SIP, or another type of IP-based communication transmitted through the telephony network and/or through another network (e.g., the Internet). The forwarding request may indicate whether all communications addressed to the initiating TN should be forwarded, or whether only certain types of communications should be forwarded (e.g., forward only voice communications, forward voice and SMS only, forward voice and MMS only, forward SMS only, forward MMS only, or the like).

The forwarding request includes the initiating TN. In examples in which the forwarding request is generated in the first UE 103a, the initiating TN may be the TN of the source UE having sent the dial-tone or text message forwarding request (i.e., as an indicator of the UE 103a from which the request was transmitted). In examples in which the forwarding request is generated in an application program, the initiating TN generally is a TN associated with a user account used to generate the forwarding request, and may or may not correspond to the TN associated with a UE 103a running the application program.

The forwarding request also includes the terminating TN, for example as a telephone number entered as part of a dial-tone code message (e.g., a phone number entered immediately following a "*72" dial code), as part of the body of a text message forwarding request, or as a phone number entered by a user in the application program used to generate the forwarding request.

The forwarding request is received in the CSCF 109, and forwarded or processed and forwarded by the CSCF 109 to the call forwarding CFS 105 at step 203. The forwarding request may simply be forwarded to the CFS 105 if the forwarding request is received by the CSCF 109 in a format compatible with the messaging and control protocol used for communications between the CSCF 109 and the CFS 105. Alternatively, the received forwarding request may be processed by the CSCF 109 prior to forwarding in order to convert the request into a format compatible with the messaging and control protocol used by the CSCF 109 and the CFS 105. The CSCF receives the forwarding request as an SIP message including the originating and terminating TNs, and forwards the SIP request to the CFS 105. In yet another example, the forwarding request generated in an application program is transmitted directly from the application program to the CFS 105, e.g. as a packet-based IP transmission transmitted through the Internet, without passing through the CSCF 109.

The forwarding request is received and processed in the CFS 105 in step 205. The CFS 105 receives the forwarding request from the CSCF 109, and identifies the request as a call forwarding request (e.g., based on the request including a call forward code, such as a "*72" code). The CFS 105 then retrieves from the forwarding request the terminating TN, and generates a call forwarding authorization request message for the terminating TN. In general, the authorization request message identifies the originating TN and the terminating TN. The authorization request also identifies the CFS 105.

In some embodiments, as part of processing a received forwarding request in step 205, the CFS 105 determines whether the terminating TN (referred to here as the first terminating TN) already has an associated call forwarding service enabled. In particular, the CFS 105 may check the call forwarding record 107 for any entries corresponding to call forwarding service in which communications addressed to the first terminating TN are forwarded to another TN (referred to here as a second terminating TN). In a first example, if the CFS 105 determines that the call forwarding record 107 already includes an entry for forwarding to the second terminating TN the communications addressed to the first terminating TN, the CFS 105 may generate and send the new call forwarding authorization request message to the second terminating TN. In the first example, the CFS 105 may additionally send a notification or other message to the first UE 103a to notify the first UE 103a that the forwarding request has been transmitted to the second terminating TN. In a second example, if the CFS 105 determines that the call forwarding record 107 already includes an entry for forwarding to the second terminating TN the communications addressed to the first terminating TN, the CFS 105 may not authorize the forwarding of communications addressed to the first terminating TN. In the second example, the CFS 105 may send a notification or other message to the first UE 103a to notify the first UE 103a that the forwarding request has not been authorized, to as to enable the first UE 103a to transmit a new forwarding request including a different terminating TN.

The CFS 105 transmits the authorization request in step 207. The authorization request is generally transmitted by the CFS 105 through the telephony network 101 to the terminating TN, or to a second UE 103b associated with the terminating TN. In some examples, however, the authorization request may be transmitted through the telephony network 101 or another network (e.g., the Internet) to an internet address (e.g., internet protocol (IP) address) or other destination associated with the terminating TN. In such examples, the CFS 105 may consult a database to retrieve an identification of an IP address, or other destination associated with the terminating TN. The authorization request may be transmitted as a messaging service message, a SIP communication, a packet message (e.g., an IP communication), or any other appropriate format. The authorization request may also be transmitted as an IVR prompt to an IVR server 113 that can make telephone calls to the UE 103b associated with the terminating TN. The format of the authorization request may be determined by the CFS 105 based on the type of telephone service associated with the terminating TN (e.g., mobile vs. landline phone service), and/or on the type of terminal or address to which the authorization request is being sent. For example, the authorization request may be transmitted as an IVR prompt when the terminating TN and/or associated UE is associated with landline phone service, as a text message when the terminating TN and/or associated UE is associated with mobile phone service, or as a SIP or one or more IP-based packets when the terminating TN and/or associated UE is associated with a SIP, IP, or other internet address or identifier. The format of the authorization request may alternatively be determined based on a user preference information, such as preference information included in the forwarding request transmitted from the first UE 103a, or preference information associated with the originating TN and/or with the terminating TN and retrieved from a user preference database by the CFS 105.

In step 209, the authorization request is received and an authorization prompt is presented to a user or UE associated with the terminating TN. As shown in FIG. 2, step 209 may be performed on the second UE 103b, and may include displaying a prompt to a user of the UE 103b for authorizing call forwarding to the UE associated with the terminating TN. The prompt may identify one or both of the originating TN and the terminating TN. The prompt may be presented in the form of an IVR prompt from IVR server 113, or a messaging service message received on the second UE 103b from a messaging service server. In examples in which the authorization request is received in a UE 103b running a call forwarding application, the call forwarding application may present the prompt as an application message presented on the second UE 103b in response to receiving the authorization request as a text, SIP, or packet-based message and identifying the authorization request as a message received from the call forwarding CFS 105. In examples in which the authorization request is received in a computer or other system running a call forwarding application, the prompt may be presented as an application message by the computer or other system. The call forwarding application may begin execution on the UE 103b, the computer, or other system in response to determining that the received request is a call forwarding authorization request.

In response to the authorization prompt being presented to the user, a user response to the prompt is received at the associated UE. The response may be received in the form of an audio/verbal response or a dial tone response (e.g., in the case of an IVR prompt), a messaging service reply message, a user selection in an application program, or the like. In response to receiving the user response, an authorization response message including the user response is transmitted to the CFS 105 in step 211. The authorization response message can be transmitted as a messaging service message from a user equipment associated with the terminating TN, as a SIP communication, an IP communication from a user equipment or computer terminal running an application program having a user account associated with the termination TN, and as an IVR prompt selection from a user equipment terminal associated with the terminating TN, or the like. The authorization response is transmitted to an SIP address, IP address, or other identifier or address for the CFS 105 which was included in the authorization request at step 207. The authorization response includes identification for the particular call forwarding request the response pertains to, such as identification of the terminating TN, a tag associated with the forwarding request, or another identifier included in the authorization request transmitted by the CFS 105. If no response to the authorization prompt is received from the user at the associated UE 103*b* within a predetermined timeout period, the UE may automatically send an authorization response message to the CFS 105 indicating that the call forwarding service is not authorized.

Upon receiving the authorization response message, the CFS 105 determines whether the user response authorizes or does not authorize the call forwarding service.

If the user response authorizes the call forwarding service, in step 213, the CFS 105 enables call forwarding service for the initiating TN to the terminating TN included in the forwarding request. In particular, the CFS 105 may update the call forwarding record 107 to include an entry including the initiating TN and the terminating TN, such that communications received for the initiating TN through the telephony network 101 are directed to a UE associated with the terminating TN. The entry in the call forwarding record 107 may include an indication of the type(s) of communications that should be forwarded (e.g., all communications, voice calls only, messaging service messages only, etc.).

If the user authorizes the call forwarding service, as part of processing a received forwarding request in step 213, the CFS 105 can determine whether the originating TN already has an associated call forwarding service enabled. In particular, the CFS 105 may check the call forwarding record 107 for any entries corresponding to call forwarding service in which communications addressed to the first originating TN are forwarded to another TN. If the CFS 105 determines that the call forwarding record 107 includes a pre-existent entry for forwarding communications addressed to the first terminating TN, the CFS 105 may delete the pre-existent entry from the call forwarding record 107 and replace the deleted entry with a call forwarding record 107 corresponding to the newly authorized call forwarding service.

If the user response does not authorize the call forwarding service, the CFS 105 does not enable call forwarding service for the initiating TN. Alternatively, if no authorization response is received from the UE 103*b* at the CFS 105 within a timeout period, the CFS 105 does not enable call forwarding service for the initiating TN. The timeout period may be a predetermined timeout period, or an adjustable or variable timeout period. For example, the timeout period may be dependent on the originating TN and/or terminating TN (e.g., dependent OD user preference information associated with the originating TN and/or terminating TN), or on the type of address or type of user equipment terminal to which the authorization request was transmitted. For instance, the timeout period may be set to the time of 8 telephone rings (or an equivalent time period) if the authorization request is transmitted as an IVR prompt; the timeout period may be set to 10 minutes if the authorization request is transmitted as a messaging service message; and the timeout period may be set to 12 hours if the authorization request is transmitted to a computer terminal, IP address, or the like.

Whether or not the call forwarding service is authorized, the CFS 105 may optionally generate and send a forwarding response message to the device or entity having generated the forwarding request message (e.g., to UE 103*a*). The forwarding response message either includes confirmation that the call forwarding service for the initiating TN has been authorized and enabled, or that the call forwarding service to the terminating TN has not been authorized. The forwarding response message may optionally also include a reason for which the call forwarding service is not authorized, such as an indication that the forwarding service is not authorized because a user response not authorizing the forwarding was received, because a UE associated with the terminating TN could not be reached, or because a timeout occurred. In one example, the forwarding response is sent in steps 215 and 217, via the CFCS 109, to the first UE 103*a* associated with the initiating TN and having generated and transmitted the forwarding request. In other examples, the forwarding response may be sent via IVR server 113, to the first UE 103*a*, or sent via packet-based communications to an application program for a UE or a user account associated with the originating TN.

Additional to or instead of sending the forwarding response message, if the user response authorizes the call forwarding service, the CFS 105 can send forwarding enable messages identifying the originating TN to the MRF server 111 in step 219*a* and/or to the MSC server 115 in step 219*b*. The forwarding enable messages may be sent by the CFS depending on user preference information associated with the originating TN, for example. Each forwarding enable message includes a request to forward a telephony tone or messaging service message to the UE 103*a* associated with the initiating TN. In response to receiving the forwarding enable messages, the MRF server 111 and MSC server 115 respectively transmit in steps 223*a* and 223*b* a telephony tone and a messaging service message to the UE 103*a* associated with the initiating TN to indicate that the call forwarding service was successfully established. In steps 221*a* and 221*b*, the MRF server 111 and MSC server 115 may optionally send a forwarding enable acknowledgment message to the CFS 105 to confirm receipt of the forwarding enable message, and/or to confirm that a telephony tone or messaging service message was successfully sent to the initiating TN.

The above description of FIG. 2 has focused on an illustrative example in which a call forwarding service is requested from an initiating TN (e.g., a TN associated with a first UE 103*a*) to initiate forwarding of calls to a terminating TN (e.g., a TN associated with a second UE 103*b*). However, method 200 may alternatively be used to request a call forwarding service from a terminating TN, to initiate forwarding of calls to the terminating TN. In the alternative example, the forwarding request message of step 201 may be transmitted from a first UE 103*a* that is associated with the terminating TN, and the request may include the terminating TN as well as the initiating TN. The request may include, for example, a code indicating that it is being initiated from the terminating TN. Upon receiving the forwarding request message, the CFS 105 may process the request (step 205) and transmit an authorization request message to the initiating TN (or to a UE associated with the originating TN). Upon receiving authorization for the forwarding service from the initiating TN, the CFS 105 may enable the call forwarding service in step 213 such that calls addressed to the initiating TN are forwarded to a UE associated with the terminating TN.

In order to enable a call forwarding service, authorization may not always be required. In some embodiments, forwarding request messages may indicate whether or not authorization should be obtained, for example by using different command messages or codes depending on whether or not authorization should be sought or obtained. In other embodiments, an authorization option may be provided to the initiating TN (or other UE or TN requesting the call forwarding service) such that authorization is sought only if the option is selected. The authorization option may take the form of a check box or other user selectable option in an application program used to request call forwarding services, or the form of a request generated in the CFS 105, sent to the UE 103*a* requesting the call forwarding service, and requesting a user selection to require or not to require authorization. The authorization may be performed, or not performed, based on user preference information such as preference information associated with the originating TN and/or with the terminating TN and retrieved from a user preference database by the CFS 105. In one example, the user preference database may be stored or maintained in a same server or database as the call forwarding record 117. Alternatively, an authorization option may be provided to the UE or TN requesting the call forwarding service based on the user preference information. For instance, the user preference information may include a list of restricted TNs for which forwarding may be blocked, for which forwarding authorization is not required, for which forwarding authorization is required, or the like. The authorization may be performed, or not performed, based on the source of or format of a forwarding request received in the CSCF 109 or CFS 105. For example, call forwarding requests received as dial-tone command messages may require authorization, while call forwarding requests received as SMS or SIP messages may not require authorization. Various combinations of the authorization modalities described herein may also be used to determine whether or not to perform call forwarding authorization.

Figure 3:
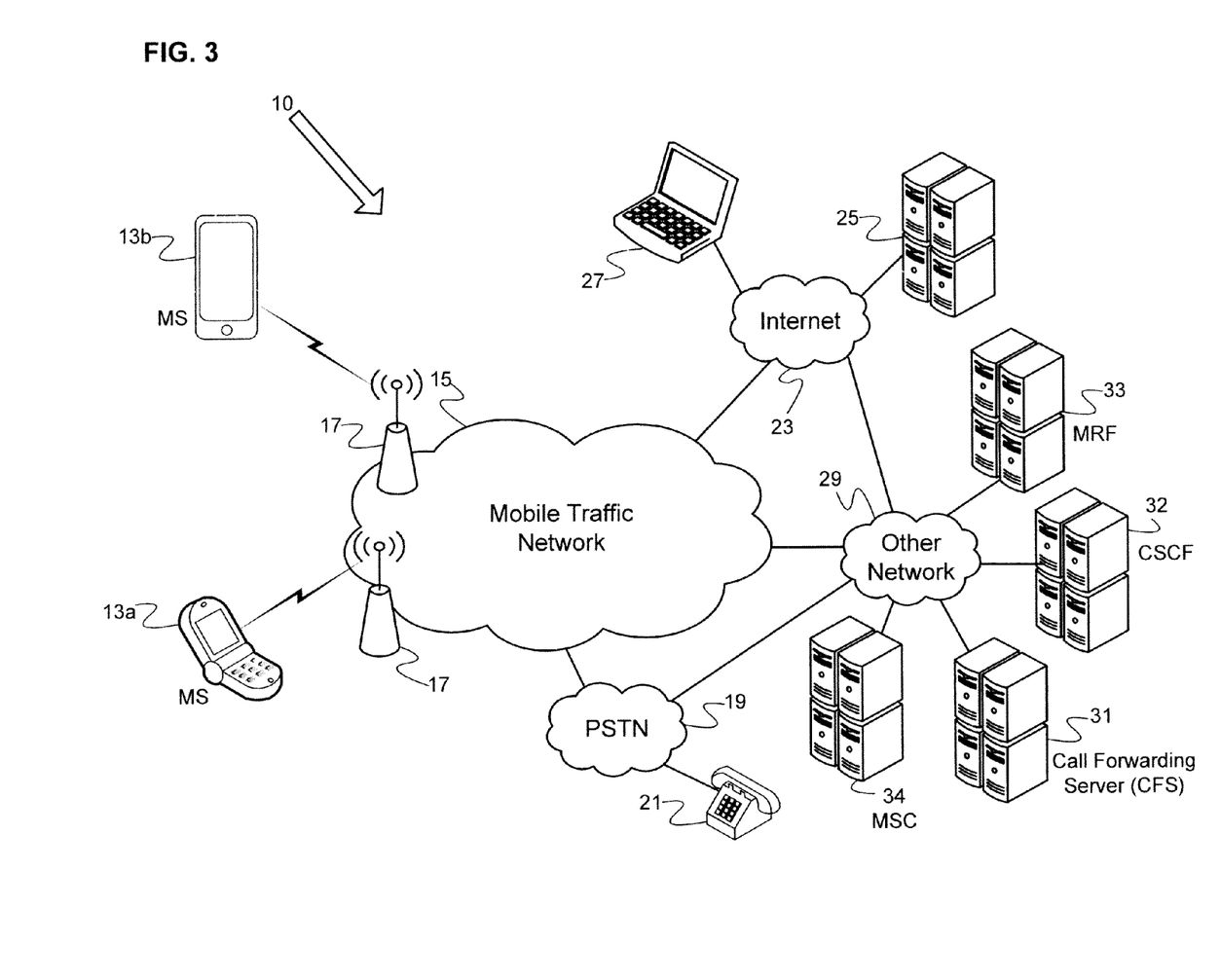
FIG. 3 is a high-level functional block diagram of an example of a system of networks/devices that provide various communications for user equipment and support an example of the authorization service for call forwarding.

FIG. 3 illustrates a system 10 offering a variety of communication services, including communications for setting up and authorizing call forwarding services for landline and mobile station users. The example shows simply two mobile stations (MSs) 13*a* and 13*b* as well as a mobile communication network 15. The example further shows landline telephone 21 as well as public switched telephone network (PSTN) 19. The stations 13*a* and 13*b* and telephone 21 are examples of user equipment terminals (such as UEs 103*a*, 103*b*, 103*c* of FIG. 1) that may be used for the call forward authorization service. However, the networks will provide similar communications for many other similar terminals and users as well as for devices/users that do not participate in the call forward authorization service. The network 15 provides mobile wireless communications services to those stations as well as to other mobile stations (not shown), for example, via a number of base stations (BSs), eNodeBs, or the like 17. The present techniques may be implemented in any of a variety of available mobile and wired networks 15 and 19, and/or on any type of user equipment terminal compatible with such networks 15/19, and the drawing shows only a very simplified example of a few relevant elements of the networks 15/19 for purposes of discussion here.

The wireless mobile communication network 15 might be implemented as a network conforming to the IMS standard, or as a network conforming to any of the code division multiple access (CDMA) IS-95 standard, the 3rd Generation Partnership Project 2 (3GPP2) wireless IP network standard or the Evolution Data Optimized (EVDO) standard, the 3GPP LTE standard, the 4G LTE, the Global System for Mobile (GSM) communication standard, a time division multiple access (TDMA) standard or other standards used for public mobile wireless communications. The mobile stations 13 and telephone terminals 21 are capable of voice telephone communications through the networks 15/19, and for the call forward authorization services, the exemplary devices 13*a*, 13*b*, and 21 are capable of one or more of dial-tone, messaging service, or data communications through the particular type of networks 15/19.

The networks 15/19 allow users of the mobile stations 13 (and other mobile stations not shown) and telephones 21 to initiate and receive telephone calls to each other. The network 15 typically offers a variety of data services via the Internet 23, such as downloads, web browsing, email, etc. The networks 15/19 also allow users of the mobile stations 13 and telephones 21 to request and authorize call forwarding services, either directly through the networks using dial-tone based codes or messaging service messages, or indirectly using application programs running on mobile stations 13, computers 27, or other user terminals. By way of example, the drawing shows a laptop PC type user terminal 27 as well as a server 25 connected through the Internet 23 to the mobile traffic network 15 and other network 29. The mobile stations 13*a* and 13*b* of users of the call forward authorization service also can receive and execute applications written in various programming languages.

Mobile stations 13 can take the form of portable handsets, smart-phones or personal digital assistants, although they may be implemented in other form factors. Mobile stations 13 may have text messaging or other messaging service capabilities, including the ability to transmit call forwarding requests, receive authorization requests, present call forwarding authorization prompts to users and receive user responses, transmit authorization responses, and receive forwarding response messages as part of the call forwarding authorization service. Program applications, including an application to assist in the call forward authorization service can be stored in non-volatile memories of many different types of mobile stations 13, and configured to execute on processors of the mobile stations 13. For example, a mobile station application providing call forwarding functionality can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The carrier will also operate a number of systems that provide functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. Systems outside of the private network could serve the same functions as well. Examples of such systems, in this case operated by the network service provider as part of the overall network 10, which communicate through the intranet type network 29, include one or more telephony servers 31 (such as call forwarding CFS 105), CSCF servers 32, MRF servers 33, MSC servers 34, and related authentication and IVR servers as needed to support the call forwarding application service of server 31.

The call forwarding authorization service may be hosted on a carrier operated server 31, for communication via the networks 15, 19, and 29. Alternatively, the call forwarding authorization service may be provided by a separate entity (alone or through agreements with the carrier), in which case, the service may be hosted on a server such as server 25 connected for communication via the Internet 23 to networks 15, 19, and 29. Servers such as 25 and 31 may provide a variety of common application or service functions in support of or in addition to call forwarding requests and responses, and authorization requests and responses received from stations 13 or telephone 21. For example, servers 25 and 31 may provide application or service functions in support of a call forwarding application program running on a mobile station 13, or on a computer 27 or other terminal running the call forwarding application program. Servers 25 and 31 may further be in communication with one or more of a call forwarding record, a CSCF server, a MRF server, an IVR server, or the like, in support of the call forwarding service.

In some examples, a call forwarding application program may run on a mobile station 13 or a computer 27 communicating through the overall network 10. In such examples, implementation of the call forwarding authorization service will involve at least some execution of programming in the mobile station 13 or computer 27 as well as implementation of user input/output functions and data communications through the network 15, from the mobile station 13, or through the network 23, from the computer 27.

As shown by the above discussion, functions relating to the enhanced call forwarding authorization service may be implemented on computers connected for data communication via the components of a packet data network, for example, operating as the call forwarding server CFS 105 and 31, as shown in FIGS. 1, 2, and 3. Although special purpose devices may be used, such devices also may be implemented using one or more hardware platforms intended to represent a general class of data processing device commonly used to run "server" programming so as to implement the server implemented call forwarding authorization functions discussed above, albeit with an appropriate network connection for data communication.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for call forwarding authorization. The software code is executable by the general-purpose computer that functions as the call forwarding server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for call forwarding authorization, in essentially the manner performed in the implementations discussed and illustrated herein.

Figures 4, 5:
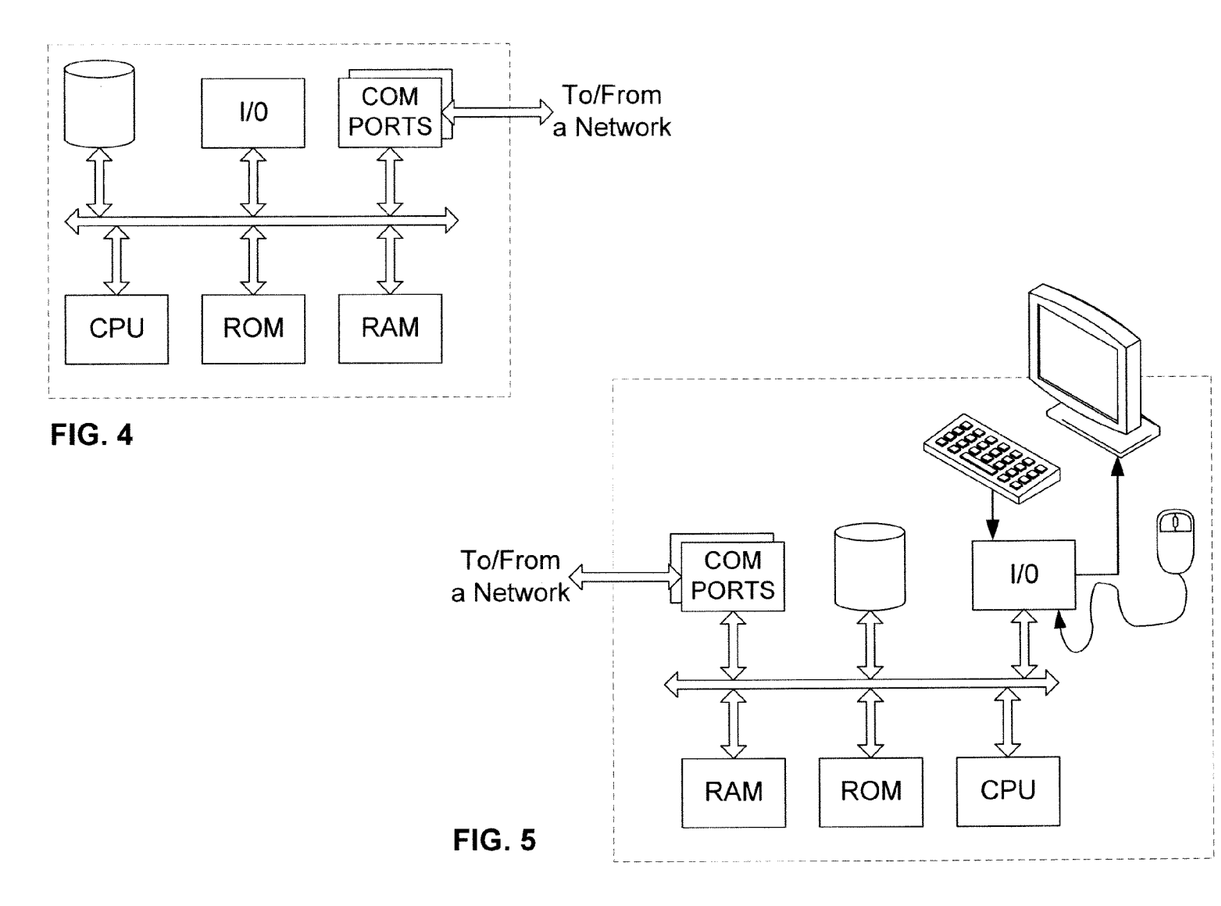
FIG. 4 is a simplified functional block diagram of a computer that may be configured as a host or server, for example, to function as the call forwarding server (CFS) in the systems of FIG. 1 or 3.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a mobile station, personal computer, or other type of work station or terminal device, although the computer of FIG. 5 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

Hence, aspects of the methods of the call forwarding authorization outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the call forwarding server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the call forward authorization server shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
receiving a request for a call forwarding service in a call forwarding server of a telephony network, the request including an initiating telephone number (TN) and a terminating TN;
in response to receiving the request, generating and sending from the call forwarding server an authorization request for the terminating TN;
receiving, in the call forwarding server, an authorization response authorizing the call forwarding service to the terminating TN; and
in response to receiving the authorization response:
sending from the call forwarding server a forwarding response to the initiating TN indicating the call forwarding service is authorized;
enabling, in the call forwarding server, call forwarding for a communication addressed for the initiating TN through the telephony network to the terminating TN;
upon enabling the call forwarding service, causing a forwarding success message to be sent to the initiating TN indicating the call forwarding service is established;
receiving a further request for another call forwarding service in the call forwarding server of the telephony network, the further request including the initiating TN and another terminating TN;
in response to receiving the further request, generating and sending from the call forwarding server another authorization request for the other terminating TN; and
in response to not receiving another authorization response authorizing the other call forwarding service, sending from the call forwarding server another response to the initiating TN indicating a user response not authorizing the other call forwarding.

2. The method of claim 1, wherein at least one of the steps of generating and sending an authorization request for a respective terminating TN comprises generating and sending an authorization request through the telephony network to the respective terminating TN.

3. The method of claim 1, wherein at least one of the steps of generating and sending an authorization request for a respective terminating TN comprises generating and sending an authorization request to an internet address associated with the respective terminating TN.

4. The method of claim 1, wherein at least one of the requests for the call forwarding service is received through the telephony network from user equipment associated with the initiating TN.

5. The method of claim 1, wherein at least one of the requests for the call forwarding service is received from user equipment or a computer terminal running an application program having a user account associated with the initiating TN.

6. The method of claim 1, wherein at least one of the steps of generating and sending an authorization request for a respective terminating TN comprises at least one of:

generating a messaging service (MS) message requesting authorization for the call forwarding service, and sending the MS message addressed to the respective terminating TN;
generating a session initiation protocol (SIP) communication requesting authorization for the call forwarding service, and sending the SIP communication addressed to the respective terminating TN;
generating an internet protocol (IP) communication requesting authorization for the call forwarding service, and sending the IP communication to an internet address or a user account associated with the respective terminating TN; or
generating an interactive voice response (IVR) prompt requesting authorization for the call forwarding service, and sending the IVR prompt to a user equipment terminal associated with the respective terminating TN.

7. The method of claim 1, wherein the step of receiving the authorization response authorizing the call forwarding service to the terminating TN comprises at least one of:

receiving a messaging service (MS) message from a user equipment associated with the terminating TN authorizing the call forwarding service to the terminating TN;
receiving a session initiation protocol (SIP) communication for the terminating TN authorizing the call forwarding service to the terminating TN;
receiving an internet protocol (IP) communication, from a user equipment or computer terminal running an application program having a user account associated with the terminating TN, authorizing the call forwarding service to the terminating TN; or
receiving an interactive voice response (IVR) prompt selection from a user equipment terminal associated with the terminating TN authorizing the call forwarding service to the terminating TN.

8. The method of claim 1, further comprising a step of:
in response to receiving the authorization response authorizing the call forwarding service, sending a forwarding enable message identifying the initiating TN to a media resource function (MRF) server,
wherein the forwarding enable message includes a request to forward a telephony tone to a user equipment associated with the initiating TN.

9. The method of claim 1, wherein the step of enabling call forwarding further comprises steps of:
updating a call forwarding record used by the telephony network to implement call forwarding, to include an entry including the initiating TN and the terminating TN; and
forwarding at least one communication received for the initiating TN through the telephony network to the terminating TN based on the entry in the call forwarding record.

10. An article of manufacture comprising:
programming to configure a call forwarding server to implement the method of claim 1; and
a non-transitory machine readable medium embodying the programming.

11. The method of claim 1, further comprising a step of notifying the initiating TN of a second forwarding response upon the call being forwarded by the terminating TN to a second other terminating TN.

12. A system comprising:
a telephony network for providing communication services between user equipment terminals; and a call forwarding server, in communication with the telephony network, configured to perform functions including functions to:
receive a request for a call forwarding service, the request including an initiating telephone number (TN) and a terminating TN;
in response to receiving the request, generate and send an authorization request for the terminating TN;
receive an authorization response authorizing the call forwarding service to the terminating TN;
in response to receiving the authorization response:
send a forwarding response to the initiating TN indicating that the call forwarding service is authorized;
enable call forwarding for a communication addressed for the initiating TN through the telephony network to the terminating TN,
upon enabling the call forwarding service, cause a forwarding success message to be sent to the initiating TN indicating the call forwarding service is established;
receive a further request for another call forwarding service in the call forwarding server of the telephony network, the further request includes the initiating TN and another terminating TN;
in response to receiving the further request, generate and send from the call forwarding server another authorization request for the other terminating TN; and
in response to not receiving another authorization response authorizing the other call forwarding service, send from the call forwarding server another response to the initiating TN indicating a user response not authorizing the other call forwarding.

13. The system of claim 12, wherein at least one of the functions to generate and send an authorization request for the terminating TN comprises a function to generate and send an authorization request through the telephony network to the respective terminating TN.

14. The system of claim 12, wherein at least one of the functions to generate and send an authorization request for the respective terminating TN comprises a function to generate and send an authorization request to an internet address associated with the respective terminating TN.

15. The system of claim 12, wherein at least one of the requests for the call forwarding service is received through the telephony network from user equipment associated with the initiating TN.

16. The system of claim 12, wherein at least one the requests for the call forwarding service is received from user equipment or computer terminal running an application program having a user account associated with the initiating TN.

17. The system of claim 12, wherein at least one of the functions to generate and send an authorization request for the terminating TN comprises at least one function to:

generate a messaging service (MS) message requesting authorization for the call forwarding service, and send the MS message addressed to the respective terminating TN;
generate a session initiation protocol (SIP) communication requesting authorization for the call forwarding service, and send the SIP communication addressed to the respective terminating TN;
generate an internet protocol (IP) communication requesting authorization for the call forwarding service, and send the IP communication to an internet address or a user account associated with the respective terminating TN; or
generate an interactive voice response (IVR) prompt requesting authorization for the call forwarding service, and send the IVR prompt to a user equipment terminal associated with the respective terminating TN.

18. The system of claim 12, wherein the function to receive the authorization response authorizing the call forwarding service to the terminating TN comprises at least one function to:
receive a messaging service (MS) message from a user equipment associated with the terminating TN authorizing the call forwarding service to the terminating TN;
receive a session initiation protocol (SIP) communication for the terminating TN authorizing the call forwarding service to the terminating TN;
receive an internet protocol (IP) communication, from a user equipment or computer terminal running an application program having a user account associated with the terminating TN, authorizing the call forwarding service to the terminating TN, or
receive an interactive voice response (IVR) prompt selection from a user equipment terminal associated with the terminating TN authorizing the call forwarding service to the terminating TN.

19. The system of claim 12, further comprising a media resource function (MRF) server,
wherein the call forwarding server is further configured to perform a function to, in response to receiving the authorization response authorizing the call forwarding service, send a forwarding enable message identifying the initiating TN to the MRF server, and
wherein the forwarding enable message includes a request to forward a telephony tone to a user equipment associated with the initiating TN.

20. The system of claim 12, wherein the function to enable call forwarding comprises functions to:
update a call forwarding record used by the telephony network to implement call forwarding, to include an entry including the initiating TN and the terminating TN; and
forward at least one communication received for the initiating TN through the telephony network to the terminating TN based on the entry in the call forwarding record.

* * * * *